US008284528B2

(12) United States Patent
Koshin et al.

(10) Patent No.: US 8,284,528 B2
(45) Date of Patent: Oct. 9, 2012

(54) DC SWITCH

(75) Inventors: Hiroaki Koshin, Toyonaka (JP); Takuya Kagawa, Muko (JP)

(73) Assignee: Panasonic Corporation, Osaka (JP)

( * ) Notice: Subject to any disclaimer, the term of this patent is extended or adjusted under 35 U.S.C. 154(b) by 139 days.

(21) Appl. No.: 12/810,296

(22) PCT Filed: Dec. 22, 2008

(86) PCT No.: PCT/JP2008/073307
§ 371 (c)(1), (2), (4) Date: Jun. 23, 2010

(87) PCT Pub. No.: WO2009/084503
PCT Pub. Date: Jul. 9, 2009

(65) Prior Publication Data

US 2010/0277846 A1 Nov. 4, 2010

(30) Foreign Application Priority Data

Dec. 28, 2007 (JP) ................................ 2007-341331

(51) Int. Cl.
*H02H 3/00* (2006.01)
*H02H 7/00* (2006.01)

(52) U.S. Cl. ................................ 361/2; 361/3; 335/201

(58) Field of Classification Search ........................ None
See application file for complete search history.

(56) References Cited

U.S. PATENT DOCUMENTS

| | | | | |
|---|---|---|---|---|
| 5,132,865 | A | 7/1992 | Mertz et al. | |
| 6,751,078 | B1 | 6/2004 | Munakata et al. | |
| 7,630,185 | B2 * | 12/2009 | Fiesoli et al. | 361/93.1 |
| 2004/0074875 | A1 | 4/2004 | Munakata et al. | |

FOREIGN PATENT DOCUMENTS

JP 62-22345 A 1/1987

(Continued)

OTHER PUBLICATIONS

International Search Report for the Application No. PCT/JP20081073307 mailed Apr. 7, 2009.

*Primary Examiner* — Jared Fureman
*Assistant Examiner* — Terrence Willoughby
(74) *Attorney, Agent, or Firm* — Cheng Law Group, PLLC

(57) ABSTRACT

The DC switch includes a housing (2) provided with a power connection terminal (2*a*) adapted in use to be connected to a power source, and a load connection terminal (2*b*) adapted in use to be connected to a load. A contact unit (1) is interposed between the power connection terminal (2*a*) and the load connection terminal (2*b*). The contact unit (1) has mechanical contacts (10), and a semiconductor switch (11) serially connected to the mechanical contacts (10). The DC switch further includes a switching mechanism unit (3) having an operating handle (30) used for manual operation and movably attached to the housing (2), a position detection unit (4) configured to detect an operating position of the operating handle (30), and a control unit (7). The switching mechanism unit (3) is configured to open and close the mechanical contacts (10) in response to the manual operation of the operating handle (30). The control unit (7) is configured to turn on the semiconductor switch (11) upon judging that the operating handle (30) has been moved to a close position from an open position based on the operating position detected by the position detection unit (4).

12 Claims, 4 Drawing Sheets

FOREIGN PATENT DOCUMENTS

| | | | |
|---|---|---|---|
| JP | 63-81714 | A | 4/1988 |
| JP | 3-105813 | A | 5/1991 |
| JP | 5-20994 | A | 1/1993 |
| JP | 9-82184 | A | 3/1997 |
| JP | 10-154448 | A | 6/1998 |
| JP | 2001-195960 | A | 7/2001 |
| JP | 2006-14479 | A | 1/2006 |
| JP | 2007-213842 | A | 8/2007 |

* cited by examiner

DC SWITCH

TECHNICAL FIELD

The present invention is directed to a DC switch used for manually operation of opening and closing a power supply line between a DC power source and a DC load.

BACKGROUND ART

In the past, there have been proposed various kinds of DC switches located in a power supply line between a DC power source and a DC load.

This kind of DC switch includes a housing provided with a power connection terminal to be connected to a power source and a load connection terminal to be connected to a load. Moreover, the DC switch includes mechanical contacts interposed between the power connection terminal and the load connection terminal. The mechanical contacts include a stationary contact and a movable contact capable of moving to contact the stationary contact and to separate from the stationary contact. The DC switch further includes a switching mechanism unit having an operating handle used for manual operation and movably attached to the housing, and the switching mechanism unit is configured to open and close the mechanical contacts in response to the manual operation of the operating handle.

In the aforementioned DC switch, to move the operating handle between an open position (position where the mechanical contacts are opened) and a close position (position where the mechanical contacts are closed) is capable of turning on and off the mechanical contacts.

At an instance of that the mechanical contacts are turned off, a potential difference between the stationary contact and movable contact is likely to cause an arc (arc discharge). Such an arc discharge may cause welding the movable contact and the stationary contact and damaging each of the stationary contact and movable contact.

Especially, in the case of the DC switch, since current flowing through the mechanical contacts is a DC current, the current flowing through the mechanical contacts has no zero point (zero crossover point) differently from an AC current. Therefore, once the arc occurs, the arc is not easily extinguished, and is likely to be maintained for a long time. Moreover, because of that a current flows only in one direction in contrast to an AC current, it is likely to see a contact shift where one of the contacts is melted and flown to the other of the contacts. Therefore, a defect where contacts can not separate from each other is likely to occur.

Consequently, there has been proposed a DC switch which is capable of extinguishing an occurred arc immediately (see Japanese Non-examined Patent Publication No. 10-154448, for example). The DC switch disclosed in the aforementioned Japanese Non-examined Patent Publication includes an extinguishing device which extinguishes an arc across contacts by elongating it by use of a Lorentz force.

Although the DC switch disclosed in the aforementioned Japanese Non-examined Patent Publication includes the extinguishing device capable of immediately extinguishing an occurred arc, the arc can occur. Therefore, it is not enough to prevent the contact shift and a contact welding caused by the arc.

DISCLOSURE OF INVENTION

In view of above insufficiency, the present invention has been aimed to provide a DC switch which is capable of reliably preventing an arcing.

The DC switch in accordance with the present invention includes a housing, a contact unit, and a switching mechanism unit. The housing is provided with a power connection terminal and a load connection terminal. The power connection terminal is adapted in use to be connected to a power source, and the load connection terminal is adapted in use to be connected to a load. The contact unit has mechanical contacts, and is interposed between the power connection terminal and the load connection terminal. The switching mechanism unit has an operating handle used for manual operation. The operating handle is movably attached to the housing. The switching mechanism unit is configured to open and close the mechanical contacts in response to manual operation of the operating handle. The contact unit includes a semiconductor switch serially connected to the mechanical contacts. The housing is configured to house a position detection unit configured to detect an operating position of the operating handle and a control unit configured to switch the semiconductor switch depending on the operating position detected by the position detection unit. The control unit is configured to turn on the semiconductor switch upon judging that the operating handle has been moved to a close position from an open position based on the operating position detected by the position detection unit while the semiconductor switch is kept turned off.

According to the present invention, the turn on of the contacts units (i.e., both of the mechanical contacts and the semiconductor switch) is accomplished only when the mechanical contacts is turned on followed by the turning on of the semiconductor switch. Thus, the turn on of the mechanical contacts alone will not flow a current through the contact unit. Accordingly, it is possible to successfully prevent an occurrence of an arc across the mechanical contacts.

In a preferred embodiment, the control unit is configured to turn off the semiconductor switch upon judging that the operating handle is moving toward the open position based on the operating position detected by the position detection unit while the semiconductor switch is kept turned on.

According to the present invention, the contact unit is turned off (both of the mechanical contacts and the semiconductor switch are turned off) through a sequence of that the semiconductor switch is turned off and subsequently the mechanical contacts are turned off. Thus, no current flows at an instance of that the mechanical contacts are turned off. Accordingly, it is possible to successfully prevent an occurrence of an arc across the mechanical contacts.

In a preferred embodiment, the DC switch includes a current measurement unit configured to measure current flowing through the contact unit, and a tripper configured to forcibly turn off the mechanical contacts. The control unit is configured to, upon judging an occurrence of an overcurrent by comparison of the current measured by the current measurement unit and an overcurrent judging threshold, activate the tripper after turning off the semiconductor switch.

According to this preferred embodiment, it is possible to forcibly open the mechanical contacts by the tripper when the overcurrent occurs. Therefore, it is possible to protect the DC switch from the overcurrent. Further, in the operation where the tripper forcibly turns off the mechanical contacts, the semiconductor switch is turned off before the mechanical contacts are turned off. Therefore, the mechanical contacts are turned off while no current flows through the contact unit. Thus, it is possible to reliably prevent an occurrence of an arc across the mechanical contacts.

In a preferred embodiment, the semiconductor switch is interposed between the mechanical contacts and the power connection terminal. The control unit has its power terminal connected to an electrical line between the semiconductor switch and the power connection terminal.

According to this embodiment, it is possible to infallibly control the semiconductor switch. Further, even if the semiconductor switch and the control unit have broken down, it is possible to prevent the semiconductor switch and control unit from causing a short circuit between the power connection terminal and the load connection terminal.

In a preferred embodiment, the DC switch includes a fuse interposed between the semiconductor switch and the power connection terminal.

According to this embodiment, the fuse blows when excessive current flows through the contact unit. Therefore, it is possible to prevent the semiconductor switch from breaking down. Thus, it is possible to protect the semiconductor switch.

BEST MODE FOR CARRYING OUT THE INVENTION

First Embodiment

Figure 1:
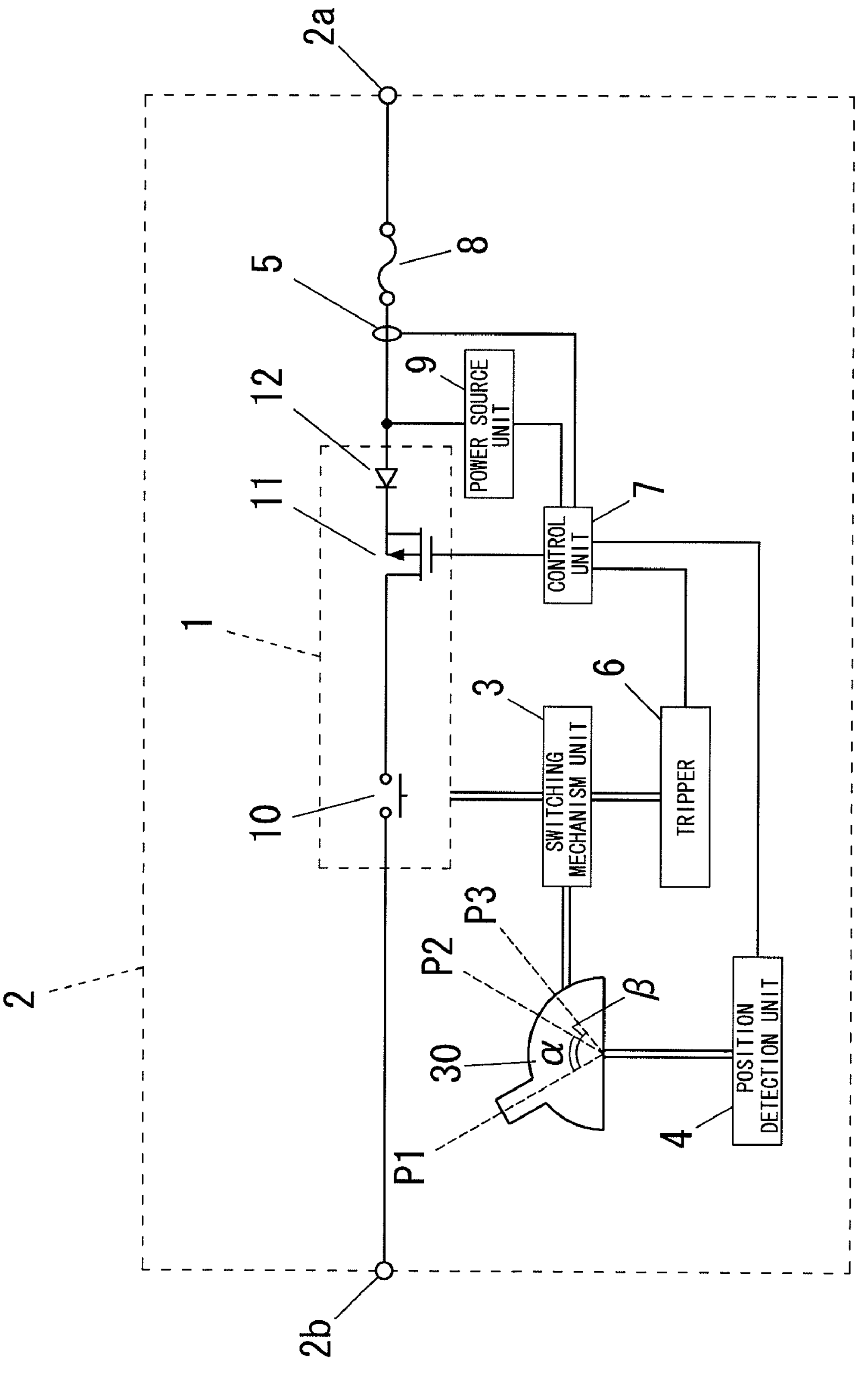
FIG. 1 is a schematic view illustrating a DC switch in accordance with a first embodiment.

As shown in FIG. 1, a DC switch in accordance with the present embodiment includes contact unit 1, a housing 2 provided with an power connection terminal 2*a* and load connection terminal 2*b*, a switching mechanism unit 3 having an operating handle (operating lever) 30 for manually operating, a position detection unit 4, a current measurement unit 5, a tripper 6, and a control unit 7.

The contact unit 1 includes mechanical contacts 10 and a semiconductor switch 11 serially connected to the mechanical contacts 10. That is, the contact unit 1 has a series circuit consisting of the mechanical contacts 10 and the semiconductor switch 11. In the following explanation, a state where both the mechanical contacts 10 and semiconductor switch 11 are kept turned on is defined as an on-state of the contact unit 1, and a state where both the mechanical contacts 10 and semiconductor switch 11 are kept turned off is defined as an off-state of the contact unit 1.

The mechanical contacts 10 are a pair of contacts (not shown). For example, one contact is a fixed contact secured to the housing 2, and another contact is a movable contact to be touched to and be separated from the fixed contact. It is noted that the mechanical contacts 10 may be of known configuration and therefore no detailed explanation thereof is deemed necessary. The semiconductor switch 11 is a Metal-Oxide-Semiconductor Field-Effect Transistor, for example. It is sufficient that the semiconductor switch 11 is a noncontact switch such as a bipolar transistor. The contact unit 1 further includes a diode 12. The diode 12 is provided in order to prevent the semiconductor switch 11 from breaking down caused by current (counter current) flowing from the load connection terminal 2*b* to the power connection terminal 2*a*. The diode 12 is interposed between the power connection terminal 2*a* and the load connection terminal 2*b* so as to have its anode electrically connected to the power connection terminal 2*a* and its cathode electrically connected to the load connection terminal 2*b*. Although FIG. 1 shows the diode 12 interposed between the semiconductor switch 11 and the power connection terminal 2*a*, an insertion position of the diode 12 is not limited.

The housing 2 is a resin molded product made of dielectric resins (e.g. phenol resins). For example, the housing 2 is formed with an opening (not shown) exposing the operating handle, as necessary.

The power connection terminal 2*a* is a terminal adapted in use to be connected to a power source (DC power source) not shown. The power connection terminal 2*a* is shaped so as to be capable of connecting to a connection member (e.g. a conductive bar or the like) and an electrical wire used for connecting to a power source (positive electrode of the power source), for example. The load connection terminal 2*b* is a terminal adapted in use to be connected to a load (DC load) not shown. The load connection terminal 2*b* is shaped so as to be capable of connecting to an electrical wire used for connecting to a load, for example.

The contact unit 1 is housed in the housing 2 while the mechanical contacts 10 and semiconductor switch 11 are connected to the load connection terminal 2*b* and power connection terminal 2*a* respectively. In short, the housing 2 has the power connection terminal 2*a* and load connection terminal 2*b*, and houses the contact unit 1 so as to interpose the contact unit 1 between the power connection terminal 2*a* and the load connection terminal 2*b*. The housing 2 further houses the switching mechanism unit 3, the position detection unit 4, the current measurement unit 5, the tripper 6, and the control unit 7.

In the present embodiment, an explanation is only made to a positive side electrical line (i.e., a line including the power connection terminal 2*a*, a load connection terminal 2*b*, and a contact unit 1 connecting these terminals) used for connecting a positive side of a power source to a load. An explanation and figure concerning a negative side electrical line (that is, a power connection terminal used for connecting to a negative side of a power source and a load connection electrically connected thereto) are omitted.

Now, interposed between the semiconductor switch 11 and the power connection terminal 2*a* is a fuse 8. The fuse 8 is configured to blow when excessive current (e.g. current which exceeds allowable current of the mechanical contacts 10 and the semiconductor switch 11) flows through the contact unit 1. Accordingly, the fuse 8 blows when the excessive current flows through the contact unit 1. Therefore, it is possible to prevent the semiconductor switch 11 from breaking down caused by the excessive current, and to protect the semiconductor switch 11. It is noted that a braided wire is used for connection of the contact unit 1, power connection terminal 2*a*, load connection terminal 2*b*, and fuse 8, for example. Moreover, configurations of the power connection terminal 2*a* and load connection terminal 2*b* can be modified in as necessitated in a particular application of the DC switch.

The operating handle 30 is made of dielectric resins. The operating handle 30 is movably (rotatively, in the present embodiment) attached to the housing 2. The operating handle 30 has a movable range (rotation range) where it moves between an open position P1, a position (close position) P2 shifted from the open position P1 by a predetermined angle $\alpha$, and a position (full close position) P3 shifted from the open position P1 by a predetermined angle $\beta$ ($\beta > \alpha$).

The switch mechanism unit 3 is constructed by mechanically linking a fixed terminal plate where the fixed contact of the mechanical contacts 10 is secured, a movable terminal where the movable contact of the mechanical contacts 10 is secured, a spring member, a latching member, and the like, for example. The switch mechanism unit 3 is configured to switch the mechanical contacts 10 in response to the manual operation of the operating handle 30. The switch mechanism unit 3 is configured to keep the mechanical contacts 1 opened (turned off) while the operating handle 30 is located at the opening position P1, and to close (turns on) the mechanical contacts 1 when the operating handle 30 has been moved from the open position P1 to the close position P2. The switch mechanism unit 3 is further configured to latch the operating handle 30 when the operating handle 30 is located at the open position P1 and full close position P3. Accordingly, the operating handle 30 is not allowed to (unexpectedly) inadvertently move between the full close position P3 and the open position P1. The switch mechanism unit 3 making the aforementioned operation may be of known configuration and therefore no detailed explanation thereof is deemed necessary.

The position detection unit 4 is configured to detect an operating position of the operating handle 30 and output the detected operating position to the control unit 7. The position detection unit 4 can be constructed by use of a rotary sensor detecting a rotation angle of the operating handle 30, for example. Further, the position detection unit 4 can be constructed by use of a hall element, a position sensor, a micro switch, a reed switch, a proximity switch, and the like, in addition to the rotary sensor.

The current measurement unit 5 is configured to measure a current (current flowing between the power connection terminal 2*a* and the load connection terminal 2*b*) flowing through the contact unit 1 and output the measured current to the control unit 7. The current measurement unit 5 can be constructed by use of a current transformer, for example. It is noted that the current measurement unit 5 can be constructed by use of a well known current detecting means (e.g. a current detector) configured to measure current on the basis of voltage across a resistor interposed between the power connection terminal 2*a* and the contact unit 1.

The tripper 6 is configured to control the switch mechanism unit 3 to forcibly open the mechanical contacts 10. The tripper 6 is an electrical tripper, for example. The electrical tripper includes a cylindrical coil bobbin, a coil disposed around an outer periphery of the coil bobbin, a fixed core, a movable core (plunger), a return spring, and the like. The fixed core is located at a first axial end side of an inside of the coil bobbin. The movable core is located at a second axial end side of an inside of the coil bobbin and is allowed to move axially. The return spring is a coil spring interposed between the fixed core and the movable core. In the electrical tripper, the movable core starts moving toward the fixed core when the coil is energized. The tripper 6 relies on the aforementioned action to separate the movable contact off the fixed contact of the mechanical contacts. The switching mechanism unit 3 is configured to move the operating handle 30 to the open position P1 when the tripper 6 forcibly turns off the mechanical contacts 10. It is noted that the tripper 6 may be of known configuration and therefore no detailed explanation thereof is deemed necessary.

The control unit 7 is constructed by use of a CPU or a logic circuit, for example. The control unit 7 has a function of controlling a potential applied to a gate of the semiconductor switch 11 as well as a function of applying predetermined current to the coil of the tripper 6. The control unit 7 has its power terminal connected to an output terminal of a power source unit 9. The power source unit 9 is provided for activating the control unit 7 in order that the control unit 7 supplies a power for applying a potential to the gate of the semiconductor switch 11, and for flowing a predetermined current through the coil of the tripper 6. The power source unit 9 is a regulator, for example. The power source unit 9 has its input terminal connected between the semiconductor switch 11 and the fuse 8. In short, electrical power used for activating the control unit 7 is supplied from an electrical line between the semiconductor switch 11 and the power connection terminal 2*a*.

The control unit 7 is configured to switch the semiconductor switch 11 on the basis of the operating position detected by the position detection unit 4. The control unit 7 is further configured to control the semiconductor switch 11 and tripper 6 on the basis of the current measured by the current measurement unit 5.

In more detail, the control unit 7 is configured to switch the semiconductor switch 11 depending on the operating position of the operating handle 30. The control unit 7 is configured to judge whether or not the operating handle 30 has been moved to the close position P2 from the open position P1 on the basis of the operating position detected by the position detection unit 4. In the present embodiment, the control unit 7 judges whether or not the rotation angle of the operating handle 30 detected by the position detection unit 4 becomes equal to the angle $\alpha$. In short, the control unit 7 functions as a judgment means (on-judgment means) which judges whether or not the operating handle 30 has been moved to the close position P2 from the open position P1 based on the operating position detected by the position detection unit 4. The control unit 7 is further configured to judge whether or not the operating handle 30 is moving toward the open position P1 on the basis of the operating position detected by the position detection unit 4. In the present embodiment, the control unit 7 judges whether or not the rotation angle of the operating handle 30 detected by the position detection unit 4 becomes less than the angle $\beta$. In short, the control unit 7 functions as a judgment means (off-judgment means) which judges whether or not the operating handle 30 is moving toward the open position P1 based on the operating position detected by the position detection unit 4.

The control unit 7 is configured to turn on the semiconductor switch 11 upon judging that the operating handle 30 has been moved to the close position P2 from the open position P1 based on the operating position detected by the position detection unit 4 while the semiconductor switch 11 is kept turned off. Moreover, the control unit 7 is configured to turn off the semiconductor switch 11 upon judging that the operating handle 30 is moving toward the open position P1 based on the operating position detected by the position detection unit 4 while the semiconductor switch 11 is kept turned on.

In addition, the control unit 7 is configured to judge whether or not the overcurrent has occurred on the basis of the current measured by the current measurement unit 5. In short, the control unit 7 functions as an overcurrent judgment means which judges, based on the current measured by the current measurement unit 5, whether or not the overcurrent has occurred. The control unit 7 is configured to, upon judging that the overcurrent has occurred, make an operation (overcurrent trip operation) where the control unit 7 turns off the contact unit 1. In the present embodiment, overload current and short-circuit current are considered as the overcurrent. The control unit 7 judges whether or not either the overload current or the short-circuit current has occurred, by comparison of the current measured by the current measurement unit 5 and an overcurrent judging threshold. The overcurrent judging threshold includes an overload current judging threshold and a short-circuit current judging threshold greater than the overload current judging threshold. The overload current judging threshold and the short-circuit current judging threshold are selected on the basis of rated current of the DC switch and the like. Immediately upon judging the occurrence of the short-circuit-current, the control unit 7 makes an instant trip operation of turning off the contact unit 1 (e.g. within 0.1 sec). The control unit 7 turns off the contact unit 1, when the control unit 7 judges that the overload current occurred and has continued for a predetermined period (see JIS C 8370). The predetermined period is shortened as the overcurrent (overload current) increases. In short, the control unit 7 makes a prolonged time trip operation (time delay trip operation).

As mentioned in the above, the control unit 7 turns off the contact unit 1 when the overcurrent occurs. The control unit 7 is configured to initially turn off the semiconductor switch 11 and subsequently control the tripper 6 to turn off the mechanical contacts 10, thereby turning off the contact unit 1. The control unit 7 of the present embodiment makes the instant trip operation when the short-circuit current occurs, and makes the prolonged time trip operation when the overload current occurs. That is, the control unit 7 can make two types of trip operations. However, the control unit 7 need not make both trip operations. It is sufficient that the control unit 7 is configured to make either the instant trip operation or the prolonged time trip operation.

The DC switch of the present embodiment is constructed as described in the above. Next, an explanation is made to an operation of the DC switch of the present embodiment. First, the switching mechanism unit 3 keeps the mechanical contacts 10 opened (turned off) in a condition where the operating handle 30 is located at the open position P1. In this condition, since the control unit 7 keeps the semiconductor switch 11 turned off, the contact unit 1 is kept turned off. Therefore, the electrical line between the power connection terminal 2*a* and the load connection terminal 2*b* is broken.

To rotate the operating handle 30 from the open position P1 to the full close position P3 switches the contact unit 1 to the on-state. In a case where the operating handle 30 is rotated from the open position P1 toward the full close position P3, the mechanical contacts 10 are turned on when the operating handle 30 is located at the close position P2. When the operating handle 30 is located at the close position P2, the rotation angle of the operating handle 30 becomes equal to the angle $\alpha$. Therefore, the control unit 7 judges that the operating handle 30 has moved to the close position P2 from the open position P1, and turns on the semiconductor switch 11. Thus, the contact unit 1 is turned on through a sequence of that the mechanical contacts 10 are turned on and subsequently the semiconductor switch 11 is turned on. It is noted that the operating handle 30 is latched when the operating handle 30 is moved to the full close position P3.

While the contact unit 1 is turned on, the control unit 7 turns off the contact unit 1 upon judging the occurrence of the overcurrent on the basis of the current measured by the current measurement unit 5. In this case, the control unit 7 turns off the semiconductor switch 11, and subsequently controls the tripper 6 to forcibly open the mechanical contacts 10. Accordingly, likewise, the semiconductor switch 11 is turned off before the mechanical contacts 10 are turned off.

To rotate the operating handle 30 from the full close position P3 to the open position P1 switches the contact unit 1 to the off-state. As the operating handle 30 rotates from the full close position P3 to the close position P2, the rotation angle of the operating handle 30 is decreased from the angle $\beta$. Therefore, the control unit 7 judges that the operating handle 30 is moving toward the open position P1, and turns off the semiconductor switch 11. Thereafter, the mechanical contacts 10 are turned off when the operating handle 30 is moved to the open position P1. Thus, the turn-off of the contact unit 1 is accomplished only when the semiconductor switch 11 is turned off followed by the mechanical contacts 10 being turned off. It is noted that the operating handle 30 is latched when the operating handle 30 is moved to the open position P1.

According to the DC switch in accordance with the present embodiment, the turn-on of the contact unit 1 initiated by a turning-on operation (closing operation) is completed through steps of the mechanical contacts 10 being turned on and subsequently the semiconductor switch 11 being turned on. Thus, the contact unit 1 sees no current only after the mechanical contacts 10 are turned on. On the other hand, the turn-off of the contact unit 1 initiated by a turning-off operation (opening operation) is completed through steps of the semiconductor switch 11 being turned off and subsequently the mechanical contacts 10 being turned off. Thus, the contact unit 1 sees no current at an instant when the mechanical contacts 10 are turned off.

Therefore, it is possible to prevent the occurrence of the arcing across the mechanical contacts 10 either at the instant of the contact unit 1 being turned on or off.

Moreover, in the case the overcurrent has occurred (the overcurrent has flowed through the contact unit 1), the tripper 6 can forcibly open the mechanical contacts 10. Therefore, it is possible to protect the DC switch from the overcurrent. In addition, when the tripper 6 operates to forcibly open the mechanical contacts 10, the semiconductor switch 11 is turned off prior to the mechanical contacts 10 being turned off, without causing to flow the current through the contact unit 1. In this case, the control unit 7 turns off the semiconductor switch 11, and subsequently controls the tripper 6 to forcibly open the mechanical contacts 10. Accordingly, likewise, the semiconductor switch 11 is turned off before the mechanical contacts 10 are turned off.

In the DC switch of the present embodiment, the semiconductor switch 11 is interposed between the mechanical contacts 10 and the power connection terminal 2*a*. The power source unit 9 has its input terminal connected between the semiconductor switch 11 and the power connection terminal 2*a*. Therefore, it is possible to supply electrical power to control unit 7 from the power source unit 9 even when the semiconductor switch 11 is kept turned off.

Further, even if the semiconductor switch 11 and the control unit 7 have broken down, it is possible to prevent the semiconductor switch 11 and control unit 7 from causing a short circuit between the power connection terminal 2*a* and the load connection terminal 2*b*. Now, it is assumed that the semiconductor switch 11 is interposed between the mechanical contacts 10 and that the load connection terminal 2*b* and that the power source unit 9 has its input terminal connected between the mechanical contacts 10 and the power connection terminal 2*a*. In this case, if the semiconductor switch 11 and the control unit 7 have broken down, an electrical line constituted by the power connection 2*a*, power source unit 9, control unit 7, semiconductor switch 11, and load connection terminal 2*b* is likely to be formed. If this electrical line has been formed, a short circuit can be formed between the power connection terminal 2*a* and the load connection terminal 2*b*. By contrast, in the present embodiment shown in FIG. 1, even if the semiconductor switch 11 and the control unit 7 have broken down, it is possible to prevent the short circuit from immediately occurring between the power connection terminal 2*a* and the load connection terminal 2*b*, because the mechanical contacts 10 exist between the power connection terminal 2*a* and the load connection terminal 2*b*.

It is noted that the DC switch of the present embodiment is an example of the present invention and that the scope of the invention is not limited to the configuration of the present embodiment. Therefore, the configuration of the present embodiment may be modified unless deviating from the scope of the present invention. For example, the DC switch need not be configured to prevent the occurrence of the arc across the mechanical contacts 10 in each of the operation where the contact 1 is turned off and the operation where the contact 1 is turned on. The DC switch may be configured to prevent the occurrence of the arc in either the operation where the contact unit 1 is turned on or the operation where the contact unit 1 is turned off. Naturally, the DC switch is preferred to be configured to prevent the occurrence of the arc in both the operation where the contact unit 1 is turned on and the operation where the contact unit 1 is turned off. In addition, the DC switch of the present embodiment has a function as a breaker because the DC switch performs the trip operation in which the DC switch turns off the contact unit 1 when the overcurrent has flowed through the contact unit 1. However, the DC switch need not have this function, and can be configured not to include the current measurement unit 5 and the tripper 6. In the present embodiment, although the explanation is made only with regard to the positive side electrical line and without referring to the negative side electrical line, it is equally possible to give the same configuration to the negative side. This applies also to the second embodiment discussed later.

Second Embodiment

The DC switch of the second embodiment is different from the first embodiment in the mechanical contacts 10 of the contact unit 1, switching mechanism unit 3, position detection unit 4, and control unit 7. The other components of the present embodiment are approximately identical to the first embodiment. Therefore, the other components are indicated with the same reference numerals as the first embodiment, and detailed explanations thereof are omitted.

Figure 2A:
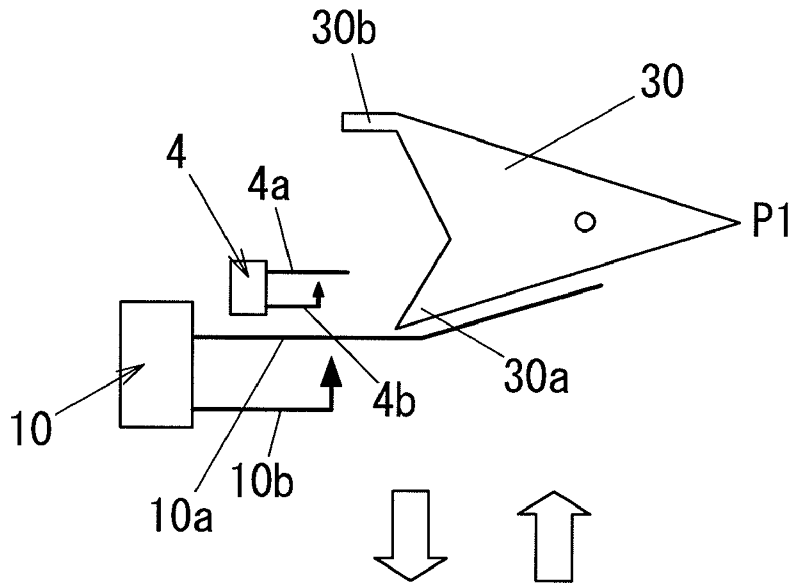
FIG. 2A is an explanatory view illustrating the above DC switch.
Figure 2B:
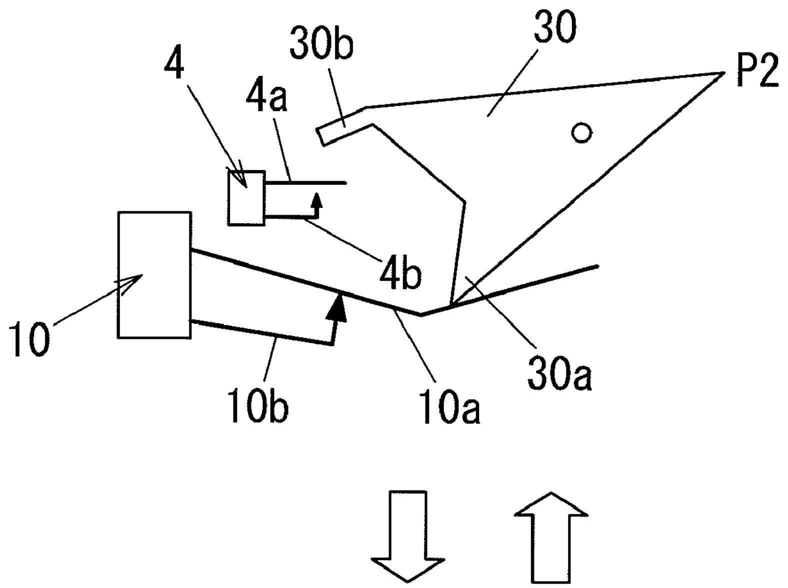
FIG. 2B is an explanatory view illustrating the above DC switch.
Figure 2C:
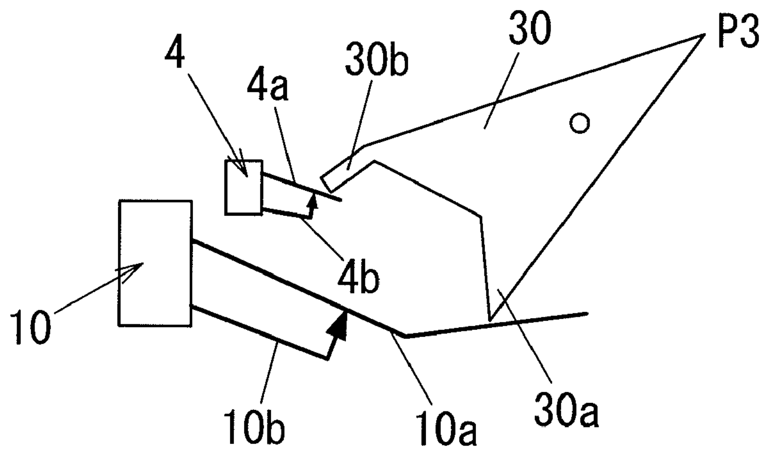
FIG. 2C is an explanatory view illustrating the above DC switch.

As shown in FIGS. 2A to 2B, the position detection unit 4 of the present embodiment includes contacts configured to be opened and closed in response to the manual operation of the operating handle 30. The operating handle 30 of the present embodiment is provided with a first pressing piece 30*a* for the mechanical contacts 10 and a second pressing piece 30*b* for the position detection unit 4. It is noted that FIGS. 2A to 2B show the simplified contact unit 10, operating handle 30, and position detection unit 4.

As shown in FIGS. 2A to 2B, the mechanical contacts 10 of the present embodiment includes a first movable plate 10*a* having one of contacts (not shown) in a pair and a second movable plate 10*b* having another of the contacts in the pair. The first movable plate 10*a* is pressed by the first pressing piece 30*a* so as to come close to the second movable plate 10*b*. The first and second movable plates 10*a* and 10*b* are made of elastic metals and shaped into an elongated plate shape. The first and second movable plates 10*a* and 10*b* are housed in the housing 2 so as to be capable of performing a following operation.

As the operation handle 30 rotates from the open position P1 to the close position P2, the first movable plate 10*a* is pressed by the first pressing piece 30*a* of the operation handle 30 to be thereby displaced to come close to the second movable plate 10*b*. Subsequently when the operation handle 30 comes into the close position P2, the first movable plate 10*a* has its contact pressed against the contact of the second movable plate 10*b* at a predetermined contact pressure. The first and second movable plates 10*a* and 10*b* are caused to come into contact with each other immediately before the operation handle 30 comes to the close position P2. That is, when the operation handle 30 comes to the close position P2, the first movable plate 10*a* becomes pressed against the second movable plate 10*b*. Whereby, the set of the contacts are pressed with each other at the predetermined contact pressure (i.e., the first and second movable plates 10*a* and 10*b* are pressed successfully with each other at the close position P2). In addition, the first movable plate 10*a* of the mechanical contacts 10 is so shaped to keep the set of the contacts pressed with each other at the predetermined contact pressure even after the operation handle 30 moves to the full close position P3. In the illustrated example, the first movable plate 10*a* is shaped into a dog-leg configuration.

When the operating handle 30 moves back to the open position P1, the first and second movable plates 10*a* and 10*b* return to their original positions respectively by resiliency given to the respective plates where the set of the contacts are out of contact from each other.

As described in the above, the mechanical contacts 10 of the present embodiment keep an open state (off state) where the set of the contacts are out of contact from each other, while the operating handle 30 is located at the open position P1 (i.e. no load is applied to the mechanical contacts 10). Meanwhile, the mechanical contacts 10 keep a close state (on state) where the set of the contacts are pressed with each other at the predetermined contact pressure, while the operating handle 30 is located at the close position P2.

The position detection unit 4 of the present embodiment has the approximately same configuration as the mechanical contacts 10 of the present embodiment. The position detection unit 4 includes a first movable plate 4*a* having a one of contacts (not shown) in a pair and a second movable plate 4*b* having another of the contacts in the pair. The position detection unit 4 is turned on and off at the different timing from that of the mechanical contacts 10. The first and second movable plates 4*a* and 4*b* are housed in the housing 2 so as to be capable of performing a following operation.

As the operation handle 30 rotates from the close position P2 to the full close position P3, the first movable plate 4*a* of the position detection unit 4 is pressed by the second pressing piece 30*b* of the operation handle 30 to be thereby displaced to come close to the second movable plate 4*b*. Subsequently when the operation handle 30 comes into the full close position P3, the first movable plate 4*a* has its contact pressed against the contact of the second movable plate 4*b* at a prescribed contact pressure. The first and second movable plates 4*a* and 4*b* are caused to come into contact with each other immediately before the operation handle 30 comes to the full close position P3. That is, when the operation handle 30 comes to the full close position P3, the first movable plate 4*a* becomes pressed against the second movable plate 4*b*. Whereby, the set of the contacts are pressed with each other at the prescribed contact pressure (i.e., the first and second movable plates 4*a* and 4*b* are pressed successfully with each other at the full close position P3). When the operating handle 30 moves back to the close position P2, the first and second movable plates 4*a* and 4*b* return to their original positions respectively by resiliency given to the respective plates where the set of the contacts are out of contact from each other.

As described in the above, the position detection unit 4 of the present embodiment keeps an open state (off state) where the set of the contacts are out of contact from each other, while the operating handle 30 is located between the open position P1 and the close position P2 (i.e. no load is applied to the position detection unit 4). Meanwhile, the position detection unit 4 keeps a close state (on state) where the set of the contacts are pressed with each other at the prescribed contact pressure, while the operating handle 30 is located at the full close position P3.

As described in the above, the position detection unit 4 of the present embodiment is turned on after the mechanical contacts 10 are turned on, and is turned off before the mechanical contacts 10 are turned off. Therefore, the control unit 7 can judge that the operating handle 30 has moved to the close position P2 from the open position P1 when the position detection unit 4 is turned on. Further, the control unit 7 can judge that the operating handle 30 is moving toward the open position P1 when the position detection unit 4 is turned off.

The control unit 7 of the present embodiment is identical to that of the first embodiment except that it is configured to turn on and off the semiconductor switch 11 in an interlocked manner with the on/off state detected at the position detection unit 4. In short, the control unit 7 of the present embodiment is configured to keep the semiconductor switch 11 turned on while the position detection unit 4 is turned on, and is configured to keep the semiconductor switch 11 turned off while the position detection unit 4 is turned off. In order to realize such controls, the control unit 7 is required to detect the on/off state of the position detection unit 4. However, such an on/off state detection may be of known configuration and therefore no detailed explanation thereof is deemed necessary.

Figure 3:
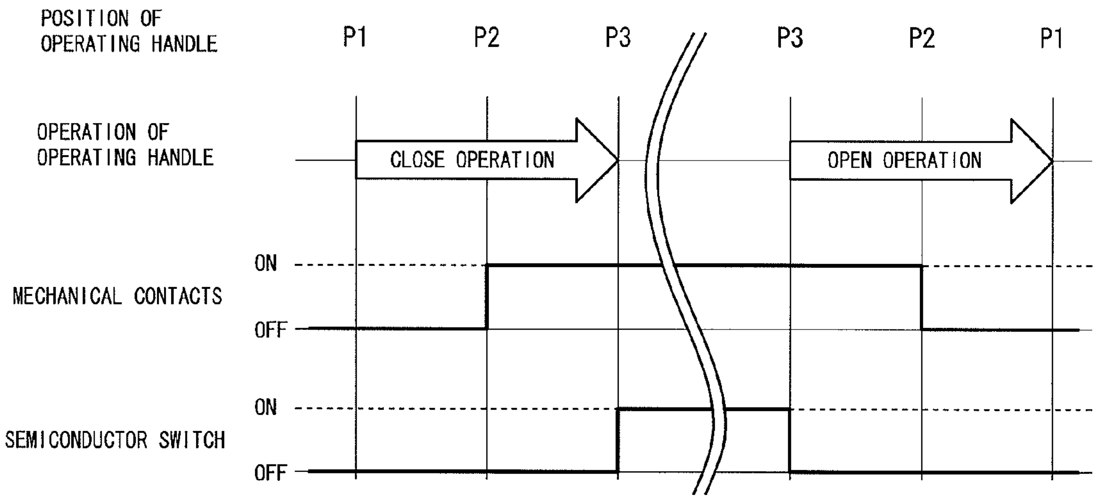
FIG. 3 is a sequential view illustrating the above DC switch.

Next, an explanation is made to the operation of the DC switch in accordance with the present embodiment with reference to a sequential view shown in FIG. 3.

The mechanical contacts 10 and position detection unit 4 are kept turned off in the condition where the operating handle 30 is located at the open position P1. In this condition, the control unit 7 keeps the semiconductor switch 11 turned off. At this time, the contact unit 1 is kept turned off. Therefore, the electrical line between the power connection terminal 2*a* and the load connection terminal 2*b* is broken.

In the turning-on operation (closing operation), the operating handle 30 is rotated to the full close position P3 from the open position P1. In this case, the mechanical contacts 10 are turned on when the operating handle 30 is located at the close position P2. By contrast, the position detection unit 4 is kept turned off even when the operating handle 30 is located at the close position P2. Therefore, the semiconductor switch 11 is kept turned off. Thereafter, when the operating handle 30 comes into the full close position P3 from the close position P2, the position detection unit 4 is turned on. Thereby, the control unit 7 turns on the semiconductor switch 11. Therefore, the turning-on operation (the turn-on of the contact unit 1) is completed through steps of the semiconductor switch 11 being turned on and subsequently the mechanical contacts 10 being turned on.

Meanwhile, in the turning-off operation (opening operation), the operating handle 30 is rotated from the full close position P3 to the open position P1. In this operation, the position detection unit 4 is turned off when the operating handle 30 has left the full close position P3. Thereby, the control unit 7 turns off the semiconductor switch 11. Thereafter, when the operating handle 30 has passed the close position P2, the mechanical contacts 10 are turned off. Thus, the turning-off operation (the turn-off of the contact unit 1) is completed through steps of the mechanical contacts 10 being turned off and subsequently the semiconductor switch 11 being turned off.

The DC switch of the present embodiment also functions in a like manner as in the first embodiment to flow no current through the contact unit 1 even when the mechanical contacts 10 are turned on as initiated by the closing operation. Further, the contact unit 1 sees no current at the instant when the mechanical contacts 10 are turned off. Accordingly, the mechanical contacts 10 can be successfully kept free from arcing either at the instant of the contact unit 1 being turned on or off. Differently from the first embodiment, the DC switch of the present embodiment need not have an expensive sensor and the like. Therefore, it is possible to reduce a production cost of the DC switch.

Figure 4:
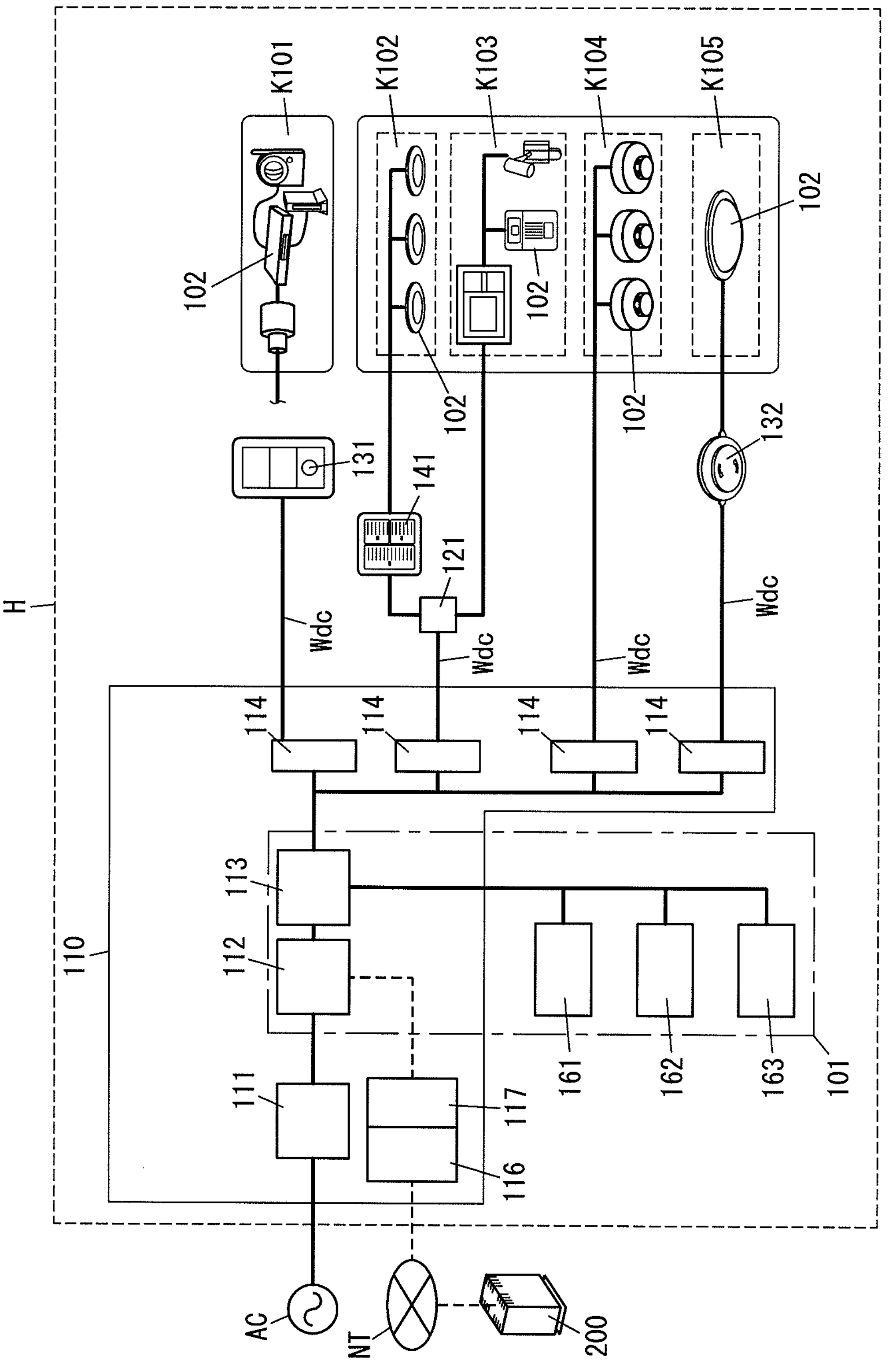
FIG. 4 is an explanatory view illustrating a DC distribution system including the above DC switch.

By the way, the DC switch of the present embodiment and first embodiment can be used as an after-mentioned DC breaker 114 in a DC distribution system shown in FIG. 4, for example.

In FIG. 4, a house H of a single-family dwelling is exemplified as a building where the DC distribution system is applied. However, the DC distribution system can be applied to a housing complex.

A DC power supply unit 101 configured to output DC power and a DC device 102 are placed in the house H. The DC device 102 is a load activated by DC power. DC power is supplied to the DC device 102 via a DC supply line Wdc connected to an output terminal of the DC power supply unit 101. The aforementioned DC breaker 114 is interposed between the DC power supply unit 101 and the DC device 102. The DC breaker 114 is configured to monitor current flowing through the DC supply line Wdc and to limit or terminate electrical power supply from the DC power supply unit 101 to the DC device 102 via the DC supply line Wdc upon detecting an abnormal state.

The DC supply line Wdc is adopted as a power line for DC power as well as a communication line. For example, it is possible to communicate between devices connected to the DC supply line Wdc by means of superimposing on a DC voltage a communication signal used for transmitting a data and made of a high-frequency carrier. This technique is similar to a power line communication technique where a communication signal is superimposed on an AC voltage applied to a power line for supplying an AC power.

The aforementioned DC supply line Wdc is connected to a home server 116 via the DC power supply unit 101. The home server 116 is a primary device for constructing a home communication network (hereinafter called "home network"). The home server 116 is configured to communicate with a subsystem constructed by the DC device 102 in the home network, for example.

In the instance shown in FIG. 4, an information system K101, lighting systems K102 and K105, an entrance system K103, and a home alarm system K104 are adopted as the subsystems. The each subsystem is an autonomous distributed system, and operates by itself. The subsystem is not limited to the aforementioned instance.

The DC breaker 114 is associated with the subsystem. In the instance shown in FIG. 4, each of the information system K101, a pair of the lighting system K102 and entrance system K103, the home alarm system K104, and the lighting system K105 is associated with one DC breaker 114. A connection box 121 is provided to associate one DC breaker 114 with a plurality of the subsystems. The connection box 121 is configured to divide a system of the DC supply line for each subsystem. In the instance shown in FIG. 4, the connection box 121 is interposed between the lighting system K102 and the entrance system K103.

The information system K101 includes the informational DC device 102 such as a personal computer, a wireless access point, a router, and an IP telephone transceiver. This DC device 102 is connected to a DC socket 131 preliminarily provided to the house H (provided at the time of constructing the house H) as a wall outlet or a floor outlet, for example.

Each of the lighting systems K102 and K105 includes the lighting DC device 102 such as a lighting fixture. In the instance shown in FIG. 4, the lighting system K102 includes the lighting fixture (DC device 102) preliminarily provided to the house H. It is possible to send a control instruction to the lighting fixture of the lighting system K102 by use of an infrared remote controller. Further, the control instruction can be sent by transmitting a communication signal from a switch 141 connected to the DC supply line Wdc. In short, the switch 114 has a function of communicating with the DC device 102. In addition, the control instruction can be sent by transmitting a communication signal from the home server 116 or from other DC device 102 of the home network. The control instruction for the lighting fixture indicates such as turning on, turning off, dimming, and blinking. Meanwhile, the lighting system K105 includes the lighting fixture (DC device 102) connected to a ceiling-mounted hooking receptacle 132 preliminarily provided on a ceiling. It is noted that the lighting fixture is attached to the ceiling-mounted hooking receptacle 132 by a contractor at the time of constructing an interior of the house H or attached to the ceiling outlet 132 by a resident of the house H.

The entrance system K103 includes the DC device 102 configured to respond to a visitor and to monitor an intruder.

The home alarm system K104 includes the alarm type DC device 102 such as a fire alarm.

Any DC device 102 can be connected to each of the aforementioned DC socket 131 and ceiling-mounted hooking receptacle 132. Each of the DC socket 131 and ceiling-mounted hooking receptacle 132 outputs DC power to the connected DC device 102. Therefore, the DC socket 131 and ceiling-mounted hooking receptacle 132 are hereinafter collectively called the "DC outlet", when a distinction between the DC socket 131 and the ceiling-mounted hooking receptacle 132 is unnecessary. A case of the DC outlet has a connection slot (plug-in connection slot) for inserting a terminal of the DC device 102. A terminal receiving member configured to directly contact to the terminal which is inserted into the connection slot is housed in the case of the DC outlet. In short, the DC outlet with above mentioned configuration makes contact-type power supply. The DC device with a communication function is capable of transmitting a communication signal via the DC supply line Wdc. The communication function is provided to not only the DC device 102 but also DC outlet. It is noted that the terminal is directly attached to the DC device 102 or is attached to the DC device 102 via a connection wire.

The home server 116 is connected to not only the home network but also the wide area network NT constructing Internet. While the home server 116 is connected to the wide area network NT, a user can enjoy service provided by a center server (computer server) 200 connected to the wide area network.

The center server 200 provides service capable of monitoring or controlling a device (which is mainly the DC device 102, but which may be other apparatus having a communication function) connected to the home network via the wide area network NT, for example. The service enables monitoring or controlling a device connected to the home network by use of a communication terminal (not shown) having a browsing function such as a personal computer, an internet TV, and a mobile telephone equipment.

The home server 116 has both a function of communicating with the center server 200 connected to the wide area network NT and a function of communicating with a device connected to the home network. The home server 116 further has a function of collecting identification information (assumed as "IP address" in this instance) concerning a device of the home network. The home server 116 and center server 200 mediate a communication between a home device and a communication terminal in the wide area network NT. Therefore, it is possible to monitor or control the home device by use of the communication terminal.

When a user attempts to monitor or control the home device by use of the communication terminal, the user controls the communication terminal so as to store a monitoring request or a control request in the center server 200. The device placed in the house establishes periodically one-way polling communication, thereby receiving the monitoring request or control request from the communication terminal. According to the aforementioned operation, it is possible to monitor or control the device placed in the house by use of the communication terminal. When an event (such as fire detection) of which the home device should notify the communication terminal occurs, the home device notifies the center server 200 of occurrence of the event. When the center server 200 is notified of the occurrence of the event by the home device, the center server 200 notifies the communication terminal of the occurrence of the event by use of an e-mail.

A function of communicating with the home network of the home server 116 includes an important function of detecting and managing a device constructing the home network. By means of utilizing UPnP (Universal Plug and Play), the home server 116 automatically detects a device connected to the home network. The home server 116 further includes a display device 117 having a browsing function, and controls the display device 117 to display a list of the detected device. The display device 117 includes a touch panel or another user interface unit. Therefore, it is possible to select a desired one from options displayed on a screen of the display device 117. Accordingly, a user (a contractor or a resident) of the home server 116 can monitor and control the device through the screen of the display device 117. The display device 117 may be separated from the home server 116.

The home server 116 manages information with relation to connection of a device. For example, the home server 116 stores a type or a function and an address of the device connected to the home network. Therefore, it is possible to make a linked operation between devices of the home network. As described in the above, the information with relation to connection of a device is automatically detected. In order to make the linked operation between the devices, it is sufficient that an association between devices is automatically made by an attribution of a device. An information terminal such as a personal computer may be connected to the home server 116. In this case, the association between devices can be made by use of a browsing function of the information terminal.

Each of the devices holds a relation with regard to the linked operations between the devices. Therefore, the devices can make the linked operation without requiring to access to the home server 116. After establishing an association with regard to the linked operation of respective devices, a lighting fixture, which is one of the devices, is caused to turn on and off by manipulation of a switch, which is another of the devices, for example. Although the association with regard to the linked operation is made for the devices belonging to the same subsystem, the association with regard to the linked operation may be made for the devices belonging to the different subsystems.

The DC supply unit 101 is configured to basically generate DC power from AC power supplied from an AC power source (for example a commercial power source located outside) AC.

In the instance shown in FIG. 4, the AC power source AC is connected to an AC/DC converter 112 including a switching regulator via a main breaker 111. The main breaker 111 is embedded in a distribution board 110. DC power output from the AC/DC converter 112 is supplied to each DC breaker 114 via a cooperation control unit 113.

The DC supply unit 101 is provided with a secondary cell 162 in view of a period (blackout period of the commercial power source) in which the DC supply unit 101 fails to receive electrical power from the AC power source AC. A solar cell 161 and fuel cell 163 configured to generate DC power can be used together with the secondary cell 162. The solar cell 161, secondary cell 162, and fuel cell 163 respectively are a dispersed power source, in view of a main power source including the AC/DC converter 112. In the instance shown in FIG. 4, the solar cell 161, secondary cell 162, and fuel cell 163 respectively include a circuit unit configured to control its output voltage. The solar cell 161 further includes not only a circuit unit of controlling electrical discharge but also a circuit unit of controlling electrical charge.

Although the solar cell 161 and fuel cell 163 of the dispersed power sources are dispensable, the secondary cell 162 is preferred to be provided. The secondary cell 162 is charged by the main power source or the other dispersed power source at the right time. The secondary cell 162 is discharged during a period in which the DC supply unit 101 fails to receive electrical power from the AC power source AC. In addition, the secondary cell 162 is discharged at the right time as necessary. The cooperation control unit 113 is configured to control discharge and charge of the secondary cell 162 and to make cooperation between the main power source and the dispersed power source. In short, the cooperation control unit 113 functions as a DC power control unit configured to control distributing to the DC device 102 electrical power from the main power source and dispersed power source constituting the DC supply unit 101. It is noted that DC power from the solar cell 161, secondary cell 162, and fuel cell 163 may be input to the AC/DC converter 112 by converting into AC power.

A drive voltage of the DC device 102 is selected from different voltages respectively suitable to individual devices of different voltage requirements. For this purpose, the cooperation control unit 113 is preferred to include a DC/DC converter configured to convert DC voltage from the main power source and dispersed power source into a desired voltage. Normally, a fixed voltage is applied to one subsystem (or the DC device 102 connected to one particular DC breaker 114). However, different voltages may be selectively applied to one subsystem by use of three or more lines. Use of two wired DC supply line Wdc can vary the voltage applied between wires with time. The DC/DC converter can be placed at plural points in a similar fashion as the DC breakers.

In the instance shown in FIG. 4, only one AC/DC converter 112 is provided. However, a plurality of AC/DC converters 112 may be connected in parallel to each other. When the plurality of the AC/DC converters 112 is provided, it is preferred to vary the number of the AC/DC converters 112 being activated in accordance with a magnitude of the load.

The aforementioned AC/DC converter 112, cooperation control unit 113, DC breaker 114, solar cell 161, secondary cell 162, and fuel cell 163 respectively are provided with a communication function. Therefore, the linked operation can be performed in response to status of each of the main power source, dispersed power source, and loads including the DC device 102. Like a communication signal used for the DC device 102, a communication signal used by the communication function is transmitted by being superimposed on DC voltage.

In the instance shown in FIG. 4, in order to convert AC power output from the main breaker 111 into DC power, the AC/DC converter 112 is placed in the distribution panel 110. However, the AC/DC converter 112 is not necessarily placed in the distribution panel 110. For example, branch breakers (not shown) may be connected to an output side of the main breaker 111 in the distribution panel 110 such that a plurality of systems is branched off from an AC supply line, and an AC/DC converter may be provided to an AC supply line of each of the systems. That is, each system may be provided with an apparatus configured to convert AC power into DC power. In this instance, it is possible to provide the DC supply unit 101 to each unit such as a floor or room of the house H. Accordingly, it is possible to manage the DC supply unit 101 for each system. In addition, it is possible to shorten a distance between the DC supply unit 101 and the DC device 102 configured to utilize DC power. Therefore, it is possible to reduce power loss caused by a voltage drop which occurs in the DC supply line Wdc. Alternatively, the main breaker 111 and branch breaker may be housed in the distribution panel 110, and the AC/DC converter 112, cooperative control unit 113, DC breaker 114, and home server 116 may be placed in another panel different from the distribution panel 110.

The invention claimed is:

1. A DC switch comprising:

a housing provided with a power connection terminal and a load connection terminal, said power connection terminal being adapted in use to be connected to a power source, and said load connection terminal being adapted in use to be connected to a load;

a contact unit having mechanical contacts, and said contact unit being interposed between said power connection terminal and said load connection terminal; and a switching mechanism unit having an operating handle used for manual operation, said operating handle being movably attached to said housing, and said switching mechanism unit being configured to open and close said mechanical contacts in response to the manual operation of said operating handle, wherein said contact unit includes a semiconductor switch serially connected to said mechanical contacts, said housing being configured to house a position detection unit configured to detect an operating position of said operating handle and a control unit configured to switch said semiconductor switch depending on the operating position detected by said position detection unit, said operating handle being rotatively attached to said housing, said operating handle having a rotation range where it moves between an open position, a close position shifted from the open position by a first predetermined angle, and a full close position shifted from the open position by a second predetermined angle greater than the first angle, said switch mechanism unit being configured to keep said mechanical contacts opened while said operating handle is located at the opening position, to close said mechanical contacts when said operating handle has been moved from the open position to the close position, and to latch said operating handle when said operating handle is located at the open position and full close position, said position detection unit being configured to detect a rotation angle of said operating handle, and said control unit being configured to turn on said semiconductor switch upon judging that the rotation angle of said operating handle detected by said position detection unit becomes equal to the first predetermined angle while said semiconductor switch is kept turned off.

2. A DC switch as set forth in claim 1, wherein said control unit is configured to turn off said semiconductor switch upon judging that the rotation angle of said operating handle detected by said position detection unit becomes less than the second predetermined angle while said semiconductor switch is kept turned on.

3. A DC switch as set forth in claim 1, further comprising:

a current measurement unit configured to measure current flowing through said contact unit; and a tripper configured to forcibly turn off said mechanical contacts, wherein said control unit is configured to, upon judging an occurrence of an overcurrent by comparison of the current measured by said current measurement unit and an overcurrent judging threshold, activate said tripper after turning off said semiconductor switch.

4. A DC switch as set forth in claim 1, wherein said semiconductor switch is interposed between said mechanical contacts and said power connection terminal, and said control unit having its power terminal connected an electrical line between said semiconductor switch and said power connection terminal.

5. A DC switch as set forth in claim 3, wherein said semiconductor switch is interposed between said mechanical contacts and said power connection terminal, and said control unit having its power terminal connected an electrical line between said semiconductor switch and said power connection terminal.

6. A DC switch as set forth in claim 4, further comprising:

a fuse interposed between said semiconductor switch and said power connection terminal.

7. A DC switch as set forth in claim 5, further comprising:

a fuse interposed between said semiconductor switch and said power connection terminal.

8. A DC switch as set forth in claim 2, further comprising:

a current measurement unit configured to measure current flowing through said contact unit; and a tripper configured to forcibly turn off said mechanical contacts, wherein said control unit is configured to, upon judging an occurrence of an overcurrent by comparison of the current measured by said current measurement unit and an overcurrent judging threshold, activate said tripper after turning off said semiconductor switch.

9. A DC switch as set forth in claim 2, wherein said semiconductor switch is interposed between said mechanical contacts and said power connection terminal, and said control unit having its power terminal connected an electrical line between said semiconductor switch and said power connection terminal.

10. A DC switch as set forth in claim 8, wherein said semiconductor switch is interposed between said mechanical contacts and said power connection terminal, and said control unit having its power terminal connected an electrical line between said semiconductor switch and said power connection terminal.

11. A DC switch as set forth in claim 9, further comprising:

a fuse interposed between said semiconductor switch and said power connection terminal.

12. A DC switch as set forth in claim 10, further comprising:

a fuse interposed between said semiconductor switch and said power connection terminal.

* * * * *